(12) United States Patent
Nen et al.

(10) Patent No.: US 8,209,978 B2
(45) Date of Patent: Jul. 3, 2012

(54) VEHICLE MASTER CYLINDER CONNECTED TO AN AUXILIARY BRAKING DEVICE

(75) Inventors: Yannick Nen, Arpajon (FR); Omar Brahml, Jiangsu Province (FR); Marc Noblet, Paris (FR); Dominique Rault, Domont (FR); Philippe Bourlon, Dammartin en Goele (FR); Lionel Bourgols, Enghien les Bains (FR); Jérémy Labarre, Guermantes (FR)

(73) Assignee: Robert Bosch GmbH, Stuttgart (DE)

( * ) Notice: Subject to any disclaimer, the term of this patent is extended or adjusted under 35 U.S.C. 154(b) by 863 days.

(21) Appl. No.: 12/265,886

(22) Filed: Nov. 6, 2008

(65) Prior Publication Data

US 2009/0126362 A1 May 21, 2009

(30) Foreign Application Priority Data

Nov. 6, 2007 (FR) ...................................... 07 07809

(51) Int. Cl.
*B60T 11/228* (2006.01)

(52) U.S. Cl. ......................................................... 60/588
(58) Field of Classification Search ...................... 60/588
See application file for complete search history.

(56) References Cited

U.S. PATENT DOCUMENTS

| 6,848,257 | B2 | 2/2005 | Bacardit et al. | |
|---|---|---|---|---|
| 7,055,322 | B2* | 6/2006 | Yasuda et al. | 60/588 |
| 7,104,059 | B2 | 9/2006 | Tsubouchi et al. | |
| 7,181,911 | B2* | 2/2007 | Ishikawa et al. | 60/588 |
| 7,343,741 | B2 | 3/2008 | Bernadat et al. | |

* cited by examiner

*Primary Examiner* — Daniel Lopez
(74) *Attorney, Agent, or Firm* — Michael Best & Friedrich LLP

(57) ABSTRACT

The invention relates to a motor vehicle master cylinder (1). More specifically, the invention relates to a piston (4, 5) of the master cylinder which has a first indentation (24) and a second indentation (27), which indentations are formed upstream of a port (13, 14) of the piston. The first indentation and the second indentation delimit a space within which hydraulic brake fluid can be stored so that it can be tapped off by an auxiliary braking device of the E.S.P. type.

14 Claims, 3 Drawing Sheets

VEHICLE MASTER CYLINDER CONNECTED TO AN AUXILIARY BRAKING DEVICE

BACKGROUND AND SUMMARY OF THE INVENTION

The invention relates to a vehicle master cylinder connected to an auxiliary braking device. What an auxiliary braking device means is a device grafted on to the master cylinder with the purpose of tapping hydraulic fluid from this same master cylinder. In one example, the auxiliary braking device may be of the E.S.P. (Electronic Stability Program known in French as "Correcteur Electronique de Trajectoire") type or the A.B.S. (Antilock Braking System, known in French as "système d'antiblocage de freinage") type. The object of the invention is to obtain a master cylinder with a low production cost. The invention is more specifically intended for the field of motor vehicles but could be applied to other fields.

The master cylinder allows a hydraulic fluid or brake fluid to be sent under pressure toward the brakes of a vehicle, the objective of this being to retard the vehicle, or even to bring the vehicle to a standstill by blocking the rotation of at least one of the wheels of the vehicle. Tandem master cylinders comprising a primary piston and a secondary piston, each one sliding in one bore of the master cylinder, are known. The primary piston and the secondary piston respectively define a primary chamber and a secondary chamber within a bore. The primary chamber and the secondary chamber are respectively connected to a primary hydraulic reservoir and to a secondary hydraulic reservoir. Each of the reservoirs contains brake fluid to fill the corresponding chamber.

The primary reservoir and the secondary reservoir communicate with the primary chamber and the secondary chamber respectively via a primary duct and a secondary duct. The primary duct and the secondary duct are created in a body of the master cylinder. The primary duct and the secondary duct open into the bore of the master cylinder.

The primary piston and the secondary piston comprise a primary port and a secondary port respectively. Each of these ports is formed in the material of which the corresponding piston is formed. Each of these ports opens via a first end facing a wall delimited by the bore of the master cylinder and via a second end into a corresponding chamber.

Positioned along the wall of the master cylinder are a primary seal and a secondary seal. The primary seal and the secondary seal control the flow of brake fluid from the primary reservoir and the secondary reservoir to the primary chamber and the secondary chamber respectively via the primary port and via the secondary port. The primary seal and the secondary seal control the flow of brake fluid according to the position of the primary piston and according to the position of the secondary piston within the bore.

As already mentioned, auxiliary braking devices which are grafted on to the master cylinder are known. These auxiliary braking devices tap brake fluid from the master cylinder. The E.S.P. controls the rotation of each of the wheels of the vehicle independently of one another. The A.B.S. prevents one wheel of the vehicle from locking up when confronted with a particular obstacle.

To operate the E.S.P. device for example, the brake fluid may be tapped directly from one of the brake fluid reservoirs of the master cylinder. In order to tap off this brake fluid, an opening may be made through this reservoir. Now, this opening may cause brake fluid leaks or pressure drop. Such leaks or such pressure drops may lead to slower braking. Alternatively, such leaks or such pressure drops may lead to difficulty in bringing the vehicle quickly to a standstill.

It is also possible to tap this fluid from the primary duct and/or from the secondary duct. To do this, a passage cross section of each of these ducts may be increased in order to obtain a sufficiently high flow rate. However, by increasing a passage cross section such as this, there is the risk that the dead travel of the corresponding piston will be lengthened. What the dead travel of the corresponding piston means is the time taken by the piston to move from an initial rest position into a position in which the brake fluid contained in the corresponding chamber begins to rise in pressure.

Machining channels along the wall of the master cylinder is also known. These channels are created in the form of helixes along this wall. Such channels may be filled with brake fluid which can then be tapped off by the E.S.P. device. However, creating such channels along the wall of the master cylinder presents problems with manufacturing, particularly since creating such helixes appreciably increases the cost of manufacture of such a master cylinder.

In order to solve these problems, the invention plans to hollow out the piston radially over a circumference of the piston so as to form an indentation. This indentation is created upstream of the port in a direction of forward travel of the piston during the braking phase.

As a preference, the piston comprises a first indentation and a second indentation that follow on from one another in the direction of forward travel of the piston during the braking phase. These first and second indentations are created in such a way that a reduction in a diameter of the piston is obtained in the direction of forward travel of the piston in the braking phase. The seal is forced to collaborate with the piston by being positioned bearing against the first indentation and against the second indentation according to the various positions of the piston within the bore.

This first indentation and this second indentation free up space between the corresponding piston and the wall of the master cylinder. Brake fluid can be housed in this space so that it can be tapped off by the E.S.P. device as already described hereinabove.

The first indentation allows the E.S.P. device to be supplied with fluid right from the start of a return of the corresponding piston to the rest position. The second indentation allows the brake fluid flow rate to be high enough to supply the E.S.P. when the master cylinder is in the rest position.

The piston according to the invention also allows the return of the corresponding chamber to an initial rest position to occur in such a way that, during this return, very few air bubbles are formed in the brake fluid contained in the corresponding chamber.

The piston according to the invention also allows the return of the corresponding chamber to an initial rest pressure to occur in such a way that, during this return, the corresponding seal is not extruded from its housing.

A subject of the invention is therefore a master cylinder for a motor vehicle and comprising
 a body in which a bore is formed longitudinally with respect to an axis of the master cylinder,
 a hydraulic fluid reservoir opening into the bore of the master cylinder,
 a piston sliding in the bore and defining a chamber of the master cylinder, the piston comprising a port opening, at one end, to face a wall delimited by the bore, and, at the other end, opening into the chamber, the port receiving hydraulic fluid from the reservoir, and
 a sealing means housed in a groove formed in the wall, the sealing means controlling the passage of hydraulic fluid through the port through collaboration between the sealing means and the piston, characterized in that the piston comprises at least one indentation created upstream of the port in the piston in a direction of forward travel of the piston during a braking phase, the seal collaborating with the piston via the indentation.

BRIEF DESCRIPTION OF THE DRAWINGS

The invention will be better understood from reading the following description and from examining the accompanying figures. These are given merely by way of entirely nonlimiting indication of the invention. The figures show.

DETAILED DESCRIPTION

Figure 1:
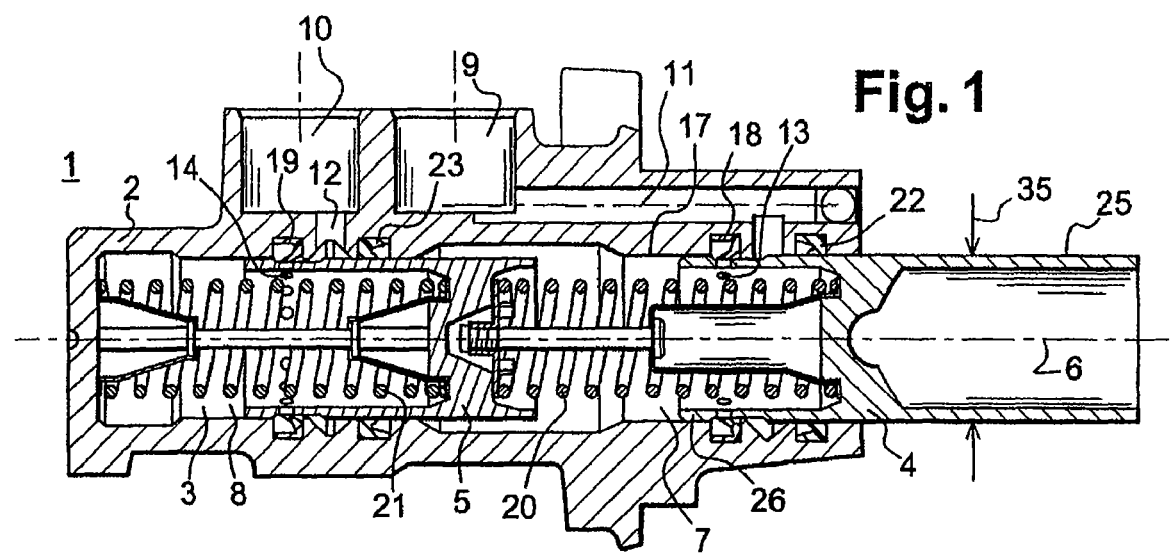
FIG. 1: a longitudinal section through a tandem master cylinder according to the invention.

FIG. 1 illustrates a motor vehicle master cylinder 1 according to the invention. In this instance, it is a tandem master cylinder. However, the invention could just as easily be applied to a single master cylinder. The master cylinder 1 according to FIG. 1 comprises a body 2 in which a bore 3 is formed. The master cylinder 1 also comprises a primary piston 4 and a secondary piston 5. The primary piston 4 is connected to a push rod which is itself connected to a vehicle brake pedal (not depicted). The primary piston 4 and the secondary piston 5 slide longitudinally in the bore 3 with respect to an axis 6 of the master cylinder. The axis 6 of the master cylinder is an axis along which the primary piston 4 and the secondary piston 5 slide during phases in which the master cylinder is braking or releasing the brakes. The primary piston 4 and the secondary piston 5 respectively define a primary chamber 7 and a secondary chamber 8. The master cylinder 1 also comprises a primary hydraulic fluid reservoir 9 and a secondary hydraulic fluid reservoir 10. Each of these reservoirs 9 and 10 opens into the bore 3 of the master cylinder to fill the primary chamber 7 and the secondary chamber 8. The primary reservoir 9 opens into the primary chamber 7 via a primary duct 11 created through the body 2 of the master cylinder. The secondary reservoir 10 opens into the secondary chamber 8 via a secondary duct 12 also created through the body 2 of the master cylinder.

Figure 2:
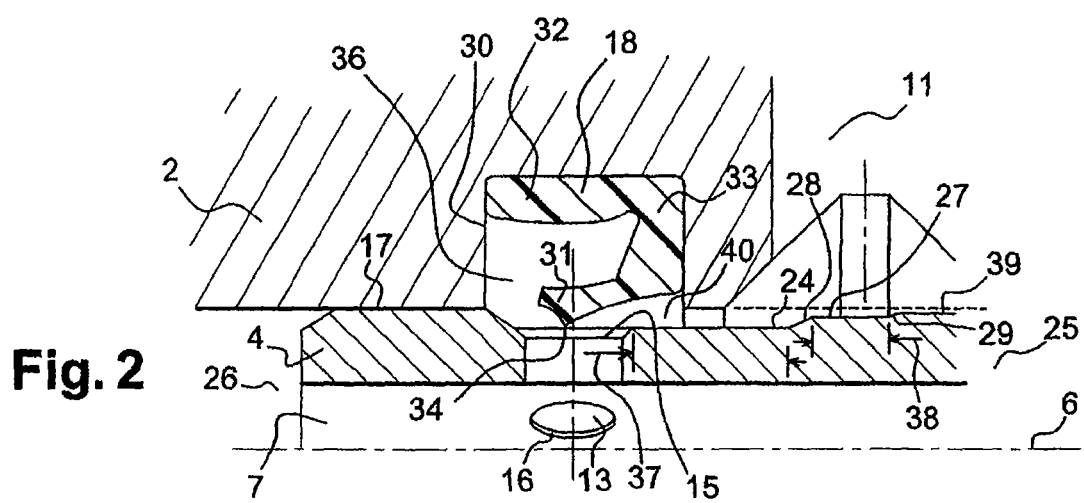
FIG. 2: a partial depiction of a master cylinder in the rest position, according to the invention.

The primary piston 4 and the secondary piston 5 comprise a primary port 13 and a secondary port 14, respectively. In the example of FIG. 2, the primary port 13 comprises a first opening 15 and a second opening 16. The primary port 13 opens via the first opening 15 facing a wall 17 delimited by the bore 3 of the master cylinder and, via the second opening 16, into the primary chamber 7. The same goes for the secondary port 14. The hydraulic fluid or brake fluid flows through the corresponding port from the first opening 15 toward the second opening 16.

The brake fluid flows from the primary reservoir 9 as far as the primary chamber 7 via the primary duct 11 and via the primary port 13. The brake fluid also flows from the secondary reservoir 10 as far as the secondary chamber 8 via the secondary duct 12 and via the secondary port 14.

The master cylinder 1 also comprises a primary seal 18 and a secondary seal 19. Each of these seals is capable of blocking passage of the brake fluid from the corresponding reservoir to the corresponding chamber through collaboration between the seal and the corresponding piston.

The primary piston 4 and the secondary piston 5 slide in the bore 3 of the master cylinder while at the same time being returned respectively toward a rest position by a primary return spring 20 and a secondary return spring 21. The primary chamber 7 is isolated from the outside via a primary sealing cup 22 and the secondary chamber 8 is isolated from the primary chamber 2 by a secondary sealing cup 23.

FIG. 2 depicts a partial view of the master cylinder 1 in longitudinal section with respect to the axis 6. This partial view depicts the primary piston 4 at a location where the primary seal 18 is situated. According to the invention, the primary piston 4 has at least one indentation 24 created in it at a location intended to collaborate with the primary seal 18, see FIG. 2. The same is true of the secondary piston 5. The primary piston 4 is hollowed out radially over a circumference of the primary piston 4 to form the indentation 24. This indentation is situated upstream of the primary port 13 in a direction of forward travel of the primary piston 4 in a braking phase. The direction of forward travel of the primary piston 4 in the braking phase is parallel to the axis 6 of the master cylinder and corresponds to a direction of travel of the primary piston 4 from the push rod toward the secondary piston 5, longitudinally with respect to the axis 6 of the master cylinder during the master cylinder braking phase.

More specifically, the primary piston 4 comprises, from a front end 26 to a rear end 24 of the piston 4 relative longitudinally to an axis of the primary piston 4, a first indentation 24 and second indentation 27. The rear end 25 corresponds to a point on the primary piston 4 intended to collaborate with the push rod. The front end 26 corresponds to a point on the primary piston 4 intended to keep away from the push rod and intended to be positioned facing the secondary piston 5. The axis of the primary piston 4 is the axis coaxial with the axis 6 of the master cylinder.

The first indentation 24 and the second indentation 27 are created on a first circumference and on a second circumference of the piston, respectively.

The first indentation 24 and the second indentation 27 form a first surface area and a second surface area. The first surface area and the second surface area delimit a cone the tip of which points in the direction of forward travel of the primary piston during the braking phase. The first indentation 24 is connected to the second indentation 27 by a first connecting surface 28. The second indentation 27 is connected, on the one hand, to the first connecting surface 28 and is connected, on the other hand, to a second connecting surface 29. The second connecting surface 29 is a surface connecting the second indentation 27 to the remainder of a surface 39 of the primary piston 4. The remainder of the surface 39 of the primary piston 4 corresponds to a surface of the primary piston 4 that extends from second connecting surface 29 as far as the rear end 25 of the piston 4. The first connecting surface 28 and the second connecting surface 29 are inclined or chamfered. The first connecting surface 28 and the second connecting surface 29 respectively form a third surface area and a fourth surface area. The third and fourth surface areas each form a cone, the tip of which points in the direction of forward travel of the primary piston in the braking phase.

The first indentation 24 is formed starting from the primary port 13. The second indentation 27 is then formed starting from the first connecting surface 28.

The primary seal 18, like the secondary seal 19, is U-shaped. A primary seal 18 such as this is positioned around the primary piston 4 and around the axis of the primary piston 4. The primary seal 18 is housed in a primary groove 30 formed in the wall 17 of the master cylinder. The primary seal 18 has an internal lip 31, an external lip 32, and an intermediate radial ring 33 connecting the internal lip 31 to the external lip 32. The internal lip 31 and the external lip 32 between them define a hole 36 facing toward the secondary piston 5. The internal lip 31 is intended to be positioned bearing against the primary piston 4. The external lip 32 is intended to be positioned pressing against the primary groove 30, against the wall 17. The intermediate ring 33 is pressed firmly against the wall 17 of the primary groove 30 also. The internal lip 31 forms a cone, the tip of which points in the direction of forward travel of the primary piston 4 in the braking phase. This internal lip 31 has a protrusion 34 extending along the internal lip 31 and standing up at right angles to a plane formed by this internal lip 31. This protrusion 34 can be used to optimize the dead travel of the primary piston. What the dead travel of the primary piston means is the distance that the primary piston has to cover longitudinally with respect to the axis 6 from a rest position to a position in which the primary seal blocks off the passage of the brake fluid. This distance is calculated to be as short as possible so that when the brake pedal is depressed, braking is obtained relatively rapidly.

When the master cylinder is in the rest position, the primary piston 4 is positioned in the bore of the master cylinder in such a way that the internal lip 31 of the primary seal 18 is positioned facing the primary port 13. The brake fluid flows freely from the primary reservoir 9 as far as the primary chamber 7, seeping between the wall 17 and the primary piston 4 and/or flowing through the primary port 13.

Then, at the time of vehicle braking, that is to say when the brake pedal is actuated, the primary piston 4 is driven toward the secondary piston 5 longitudinally with respect to the axis 6 of the master cylinder. During this driving movement, the primary piston 4 slides against the protrusion 34 of the internal lip 31. The protrusion 34 is first of all placed bearing against the first indentation 24. As soon as the protrusion 34 comes to bear against the first protrusion 24, the communication between the primary reservoir 9 and the primary port 13 is cut off because the primary seal 18 lies between the primary port 13 and the primary duct 11. Likewise, the communication there was between the wall 17 and the primary piston 4 is also cut off.

Next, as the primary piston 4 continues to move toward the secondary piston 5, the primary seal 18 finds itself bearing via its protrusion 34 against the first connecting surface 28, then against the second indentation 27, then against the second connecting surface 29 and finally, possibly, against the remainder of the surface 39 of the primary piston 4. During this movement of the primary piston, the internal lip 31 tends to move closer to the external lip 32. This increases the clamping of the primary seal 18 because of an increase in a diameter 35 of the primary piston 4 from the first indentation 24 toward the second indentation 27.

During brake release or release of the brake pedal, the primary piston 4 returns to its initial rest position. By returning to its initial rest position, the primary piston 4 is moved in such a way that the internal lip 31 of the primary seal 18 positions itself against the second connecting surface 29, then against the second indentation 27, then against the first connecting surface 28, then against the first indentation 24 and finally returns to face the primary port 13. At that moment, the brake fluid can once again seep into the primary chamber 7 by passing between the wall 17 and the primary piston 4 and/or by passing through the primary port 13. During this return to the initial rest position, the internal lip 31 tends to move away from the external lip 32. This reduces the clamping of the primary seal 18. The internal lip 31 tends to separate from the external lip 32 because of a reduction in diameter 35 of the primary piston 4 from the second indentation 27 toward the first indentation 24.

During the return of the primary piston 4 to its initial rest position, a space 40 delimited by the first indentation 24, the second indentation 27, the wall 17 and the primary seal 14 is progressively filled with brake fluid.

The brake fluid stored in this space 40 can precisely be tapped off by a braking device other than the master cylinder. In effect, in one example, an E.S.P. (Electronic Stability Program known in French as "Correcteur électronique de trajectoire") device or an A.B.S. (Antilock Braking System, known in French as "système d'antiblocage de freinage") device may be grafted on to the master cylinder. The E.S.P. device can be used to control the rotation of the wheels of the vehicle independently of one another. The A.B.S. device can be used to prevent the wheels of the vehicle from locking up when confronted with particular obstacles.

The first indentation 24 and the second indentation 27 have a first length 37 and second length 38 respectively. The first length 37 is such that the amount of brake fluid stored between the first indentation 24 and the wall 17 is sufficient to operate the E.S.P. device when the master cylinder is in the rest position.

The second length 38 of the second indentation 27 corresponds to a distance that the primary piston 4 has to travel in order to achieve two-thirds of a brake-release travel. What the brake-release travel of the primary piston 4 means is the time taken for the primary piston 4 to move in the bore from a first position that corresponds to a position in which the wheels of the vehicle are braked or at a standstill, to a second position at which the primary piston is once again in the initial rest position. When the primary piston 4 is positioned, with respect to the bore, two-thirds of the way along the brake release travel, the primary seal is positioned against the primary piston 4 at a junction. A body of brake fluid can therefore be stored between the primary seal 18, the second indentation 27, the second connecting surface 29 and the wall 17. This volume of brake fluid can be used to supply the E.S.P. device when the primary piston 4 has not yet returned to its initial rest position.

In order to prevent the primary seal 18 from being extruded from the primary groove 30 and to prevent air bubbles from forming in the primary chamber 7 as the primary piston 4 returns to its initial rest position, the connecting surfaces 28 and 29 are chamfered or inclined. This is because giving the connecting surfaces 28 and 29 a chamfered shape allows the internal lip 31 to move progressively toward the external lip 32 or away from the external lip 32. The master cylinder returns to its initial rest pressure relatively linearly and progressively as a function of time under sudden braking or release of the brake pedal.

Figure 3:
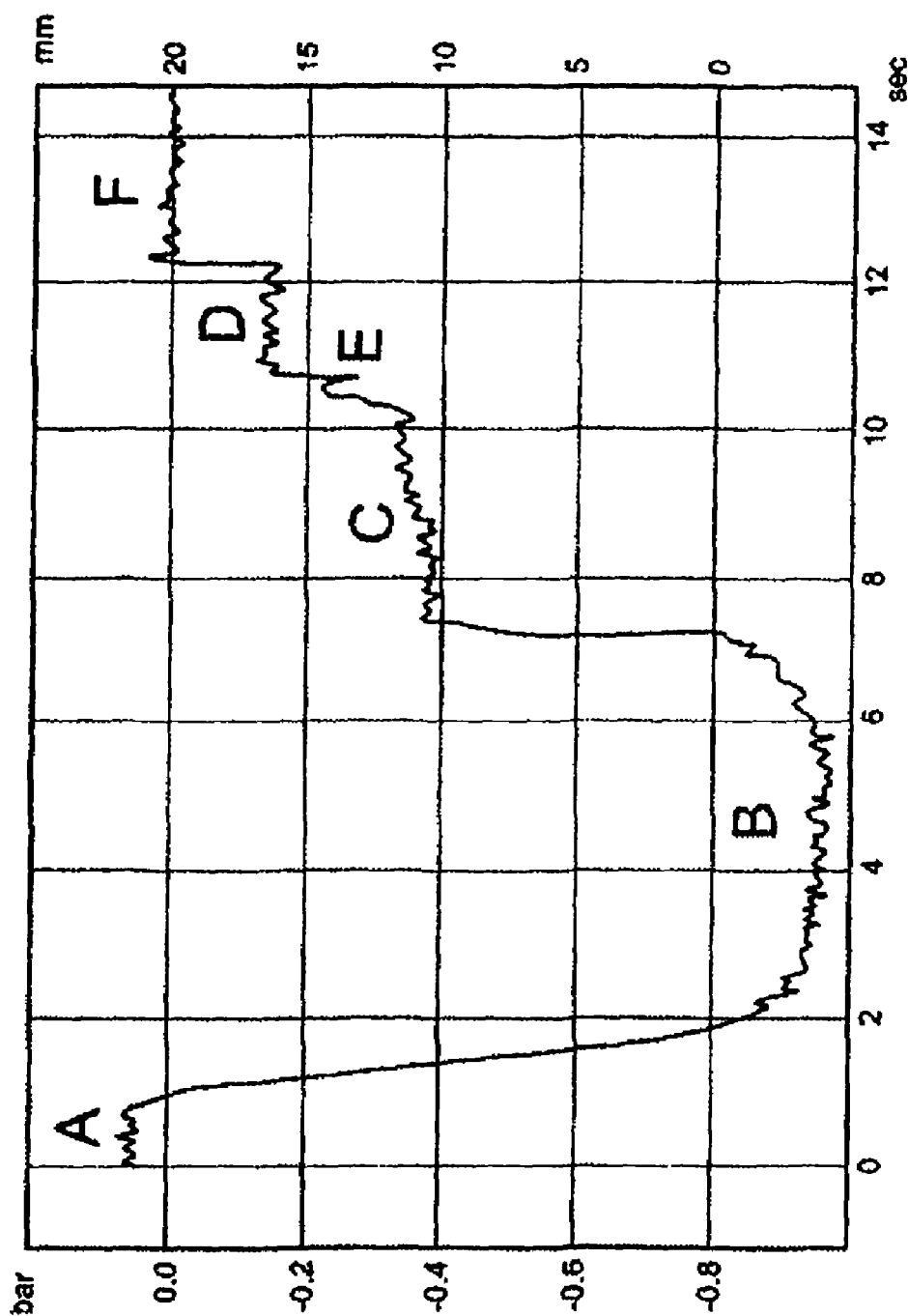
FIG. 3: a graphic depiction of a pressure inside a chamber of the master cylinder as a function of the position of a corresponding piston in a bore of the master cylinder, according to the invention.

FIG. 3, illustrates in a graphic form, a change in pressure obtaining in the primary chamber 7 as a function of time and as a function of the position of the primary piston 4 according to the invention within the bore. A depicts the pressure obtaining inside the primary chamber when the primary piston is in the rest position. It is 0.04 bar approximately. B depicts the pressure obtaining in the primary chamber 7 when the primary piton 4 is in the braking position. It is −0.98 bar approximately. A, C and D depict the pressure obtaining in the primary piston 7 when the primary piston 4 is in the brake-release position. It is −0.38 bar approximately at C and −0.16 bar approximately at D. The pressure obtaining in the primary chamber 7 changes in step levels from C toward D, the first level being the level C and the second being the level D. The level C more specifically represents the hydraulic pressure obtaining in the primary chamber 7 when the primary piston 4 is positioned relative to the primary seal 18 with the primary seal 18 pressing against the second indentation 27. The level D more specifically depicts the hydraulic pressure obtaining in the primary chamber 7 when the primary piston 4 is positioned with respect to the primary seal 18 such that the primary seal 18 is positioned bearing against the first indentation 24. E depicts a jumping pressure that occurs when the primary piston 4 is positioned with the primary seal 18 bearing against the first connecting surface 28. F represents the hydraulic pressure obtaining in the primary chamber 7 as the primary piston 4 returns to its initial rest position.

The invention claimed is:

1. Master cylinder for a motor vehicle and comprising
    a body (2) in which a bore (3) is formed longitudinally with respect to an axis (6) of the master cylinder,
    a hydraulic fluid reservoir (9, 10) opening into the bore of the master cylinder,
    a piston (4, 5) sliding in the bore and defining a chamber (7, 8) of the master cylinder, the piston comprising a port (13, 14) opening, at one end, to face a wall (17) delimited by the bore, and, at the other end, opening into the chamber, the port receiving hydraulic fluid from the reservoir, and
    a sealing means (18, 19) housed in a groove formed in the wall, the sealing means controlling the passage of hydraulic fluid through the port through collaboration between the sealing means and the piston, characterized in that a first indentation (24) and a second indentation (27) are created upstream of the port of the piston in the direction of forward travel of the piston during the braking phase, a reduction in a diameter (35) of the piston being obtained from the second indentation to the first indentation,
    characterized in that the piston (4, 5) has a first connecting surface (28) and a second connecting surface (29), the first connecting surface (28) connecting the first indentation (24) to the second indentation (27), the second connecting surface (29) connecting the second indentation (27) to a remainder of the surface of the piston, the first and second connecting surfaces being chamfered.

2. Master cylinder according to claim 1, characterized in that the first indentation (24) and the second indentation (27) respectively form a first surface area and a second surface area, the first surface area and the second surface area delimiting a cone, the tip of which points in the direction of forward travel of the piston during the braking phase.

3. Master cylinder according to claim 1, characterized in that the first indentation (24) is formed starting from the port (13, 14).

4. Master cylinder according to claim 1, characterized in that the first indentation (24) is formed over a circumference of the piston (4, 5).

5. Master cylinder according to claim 1, characterized in that the port (13, 14) has a chamfered edge surface.

6. Master cylinder according to claim 1, characterized in that at least one of the first indentation (24) and the second indentation (27) has a substantially cylindrical surface.

7. Master cylinder according to claim 6, characterized in that the first indentation (24) and the second indentation (27) each have a substantially cylindrical surface.

8. Master cylinder for a motor vehicle and comprising
    a body (2) in which a bore (3) is formed longitudinally with respect to an axis (6) of the master cylinder,
    a hydraulic fluid reservoir (9, 10) opening into the bore of the master cylinder,
    a piston (4, 5) sliding in the bore and defining a chamber (7, 8) of the master cylinder, the piston comprising a port (13, 14) opening, at one end, to face a wall (17) delimited by the bore, and, at the other end, opening into the chamber, the port receiving hydraulic fluid from the reservoir, and
    a sealing means (18, 19) housed in a groove formed in the wall, the sealing means controlling the passage of hydraulic fluid through the port through collaboration between the sealing means and the piston,
    characterized in that the piston (4, 5) has an outer surface and a first indentation (24) and a second indentation (27) created in the outer surface upstream of the port of the piston in the direction of forward travel of the piston during the braking phase, a reduction in a diameter (35) of the piston being obtained from the outer surface to the second indentation and from the second indentation to the first indentation, in that the first indentation (24) starts from the port (13, 14), and in that the first indentation has a first surface area and the second indentation has a second surface area, the first surface area and the second surface area being substantially co-axial.

9. Master cylinder according to claim 8, characterized in that the piston (4, 5) has a first connecting surface (28) connecting the first indentation (24) to the second indentation (27), and a second connecting surface (29) connecting the second indentation (27) to a remainder of the surface of the piston, the first and second connecting surfaces being chamfered.

10. Master cylinder according to claim 8, characterized in that the first surface area and the second surface area delimit a cone, the tip of which points in the direction of forward travel of the piston during the braking phase.

11. Master cylinder according to claim 8, characterized in that the first indentation (24) is formed over a circumference of the piston (4, 5).

12. Master cylinder according to claim 8, characterized in that the port (13, 14) has a chamfered edge surface.

13. Master cylinder according to claim 8, characterized in that the first indentation (24) and the second indentation (27) each have a substantially cylindrical surface area.

14. Master cylinder according to claim 8, characterized in that the piston has an axis, and in that the first surface area and the second surface area are substantially co-axial with the piston axis.

* * * * *